(12) United States Patent
Roth

(10) Patent No.: US 6,219,931 B1
(45) Date of Patent: Apr. 24, 2001

(54) TARGET BASE FOR A MEASURING SYSTEM

(75) Inventor: Thomas H. Roth, Moreno Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/041,080

(22) Filed: Mar. 10, 1998

(51) Int. Cl.⁷ .................................................. G01B 5/00
(52) U.S. Cl. ............................ 33/645; 33/573; 33/DIG. 2
(58) Field of Search ........................... 33/293, 297, 299, 33/DIG. 2, 533, 613, 645, 573, 347; 248/683, 363, 362, 205.5; 439/83; 451/94

(56) References Cited

U.S. PATENT DOCUMENTS

| 1,851,028 | * | 3/1932 | Worrall | 248/363 |
| 2,148,055 | * | 2/1939 | Blumenthal | 248/362 |
| 2,535,051 | * | 12/1950 | Donohue | 33/370 |
| 2,565,793 | * | 7/1949 | Weismantel | 248/362 |
| 2,831,260 | * | 4/1958 | Shaw | 33/174 |
| 2,939,671 | * | 11/1960 | Beekman | 248/683 |
| 3,540,256 | * | 7/1967 | Thompson | 33/297 |
| 3,716,307 | * | 2/1973 | Hansen | 248/362 |
| 4,336,765 | * | 6/1982 | Coughlin | 248/362 |
| 4,898,452 | * | 2/1990 | Kawachi et al. | 33/293 |
| 4,964,218 | | 10/1990 | Morghen | 33/293 |
| 5,013,075 | * | 5/1991 | Littell | 248/363 |
| 5,087,005 | * | 2/1992 | Holoff et al. | 248/363 |
| 5,119,564 | * | 8/1951 | Hamilton et al. | 33/299 |
| 5,473,822 | * | 12/1995 | Struble | 33/DIG. 2 |

FOREIGN PATENT DOCUMENTS

| 40392613 | * | 4/1989 | (JP) | 248/363 |
| 093002294 | * | 2/1993 | (WO) | 248/363 |

* cited by examiner

Primary Examiner—Diego Gutierrez
Assistant Examiner—Maria Fernandez
(74) Attorney, Agent, or Firm—Terry J. Anderson; Karl J. Hoch, Jr.

(57) ABSTRACT

A target base (10) for attaching an apparatus (13) to an object (11) has a substantially rigid body (12) with a mount surface (14) adapted to couple the apparatus (13) to the body (12), and a base surface. A suction cup (46) affixed to the base surface (18) of the target base (10) has a suction cavity (62) defined by a deformable sealing lip (64) at the perimeter of the suction cup (46). The sealing lip (64) and suction cavity (62) form with the object (11) a vacuum chamber (66). A vacuum system (44) includes vacuum passages (50, 52) for communicating a vacuum pressure to the vacuum chamber (66). One or more contact members (60) are affixed to the body and have contact surfaces which engage the object (11) to provide consistent off-set positioning of the target base (10) with respect to the object (11).

22 Claims, 3 Drawing Sheets

TARGET BASE FOR A MEASURING SYSTEM

STATEMENT OF GOVERNMENT RIGHTS

This invention was made with Government support under contract F33657-87-C-2000 awarded by the United States Air Force. The Government has certain rights in this invention.

TECHNICAL FIELD OF THE INVENTION

This invention relates generally to the field of measuring devices and more particularly to a target base for a measuring system.

BACKGROUND OF THE INVENTION

It is common practice when measuring the surface contour of an object to take measurements of the object using an optical or laser measuring apparatus. One such method includes marking predetermined locations on the object and attaching targets to the object at each location. Conventional target bases generally utilize a magnet or multiple suction cups to attach the target to the object. Conventional target bases may also provide proper spacing of the target from the surface of the object by feet that make point contact with the object. In many applications, it is necessary to keep the targets attached to the object being measured for long periods of time, such as when two or more sub-assemblies are being assembled and their relative positions are being established prior to joining them.

Conventional target bases that utilize small suction cups generally operate by being pressed onto the surface of the object. The air is squeezed out of the suction cups and the suction cups are released whereupon they partially resile and form a vacuum within the suction cup. Suction cups have several disadvantages. For example, the force that the suction cups exert is relatively small, inasmuch as it is a function of the resiliency of the suction cup. Accordingly, even when several suction cups are used on a target, the force holding the target to the object is relatively low, and there is a chance that the target will change position or even become dislodged. In addition, suction cups must be applied with attention to making sure that all of the suction cups are evenly pressed onto the surface of the object, lest there be an uneven suction force among them, thus allowing the target to tilt in the direction of a greater suction force. Furthermore, suction cups are inherently resilient, thereby displacing the target away from the surface. Because of the displacement, or rebound, of the target from the surface of the object, the legs that set the distance of the target from the surface of the object are often not effectively engaged.

The amount of rebound the target experiences is subject to variation that is dependent upon many factors, such as environmental conditions (e.g., temperature and humidity), the orientation of the target (e.g., gravity forces opposing or aiding the suction cups), and the physical condition of the suction cups (e.g. age, wear, and the like). Other problems associated with suction cups may include creep of the sealing lips of the suction cups that allows them to loosen, and leakage that allows the suction cups to lose their vacuum over time.

In short, pressed-on suction cups provide scant assurance that the targets on the object are uniformly positioned at predetermined locations and that the offset distance and the target angle accurately reflects the surface of the object. In addition, it cannot be assured that pressed-on suction cups will not move over time or even be dislodged.

SUMMARY OF THE INVENTION

Accordingly, a need has arisen for an improved target base for a measuring system. The present invention provides a target base that substantially eliminates or reduces problems associated with the prior methods and systems.

In accordance with one embodiment of the present invention, a target base for attaching an apparatus to an object includes a substantially rigid body having a mount surface adapted to couple an apparatus or target to the body, and a base surface. A suction cup is affixed to the base surface of the body and has a suction cavity that is defined by a deformable sealing lip at the perimeter of the suction cup. The sealing lip and vacuum cavity in conjunction with the object form a vacuum chamber. A vacuum system communicates a vacuum pressure to the vacuum chamber. The target base also includes one or more contact members which are coupled to the base surface of the body to provide consistent off-set positioning of the target base with respect to the object.

In a particular embodiment, the target base includes a sight system used to accurately position the target base with respect to the object. The sight system may include a hole through the target base, a mounting sleeve assembly housed within the hole, and a reticle mounted within the mounting sleeve assembly in sealed relation. The reticle may include a targeting guide, such as a circle and cross hairs, for precise positioning of the target base over the object.

In another embodiment, a locating system is associated with the mount surface of the target base to ensure accurate mating of the apparatus with the target base in a predetermined position. A simple but highly accurate locating system may consist of two circular cylindrical bosses that project from the mount surface and have different diameters. The base may also include threaded holes in the body opening at the mount surface and adapted to receive screws by which the apparatus is attached to the target body.

In a particular embodiment of the present invention, the contact surfaces of the contact members are located within the suction cavity, primarily to maximize the area of the suction cup. The contact members may include threaded attachment shanks that pass through the suction cup and are threaded into the body and have heads configured to make substantially point contact with the surface of the object. In general, three contact members equidistant from each other and from a center axis perpendicular to a plane created by the mount surface of the target base are used. The sealing lip of the suction cup may be concentric with the center axis. The described configuration of the contact members and sealing lip of the suction cup provides a distribution of forces due to the pressure differential across the suction cup such that the centroid is along the center axis and the reaction forces on the contact members are equal.

One technical advantage of the present invention is to provide a target base for an apparatus, such as a target, to be used in optical or laser measuring systems that will support the apparatus with high accuracy over a point on an object. Another technical advantage is to provide a target base that provides accurate positioning of the apparatus relative to the point to be measured on the surface of the object, regardless of the orientation of that surface to which the target base is attached relative to the horizontal—i.e., the accuracy of the positioning of the target base is not affected by gravitational forces acting on the target base and the apparatus that it supports. Other technical advantages include stable positioning of the apparatus without movement over long periods of time.

A further technical advantage of the present invention is to provide a suction cup that is substantially coextensive with the mount surface to allow a large retention force of the vacuum created within the suction cup. The retention force of the vacuum created within a suction cup of the present invention having a large area is generally greater than that of conventional suction cups having smaller areas. Furthermore, the larger area of the suction cup of the present invention allows the target base to be attached to the object with a lower vacuum than that required for conventional suction cups.

Other technical advantages of the present invention will be readily apparent to one skilled in the art form the following figures, description, and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

Figure 1:
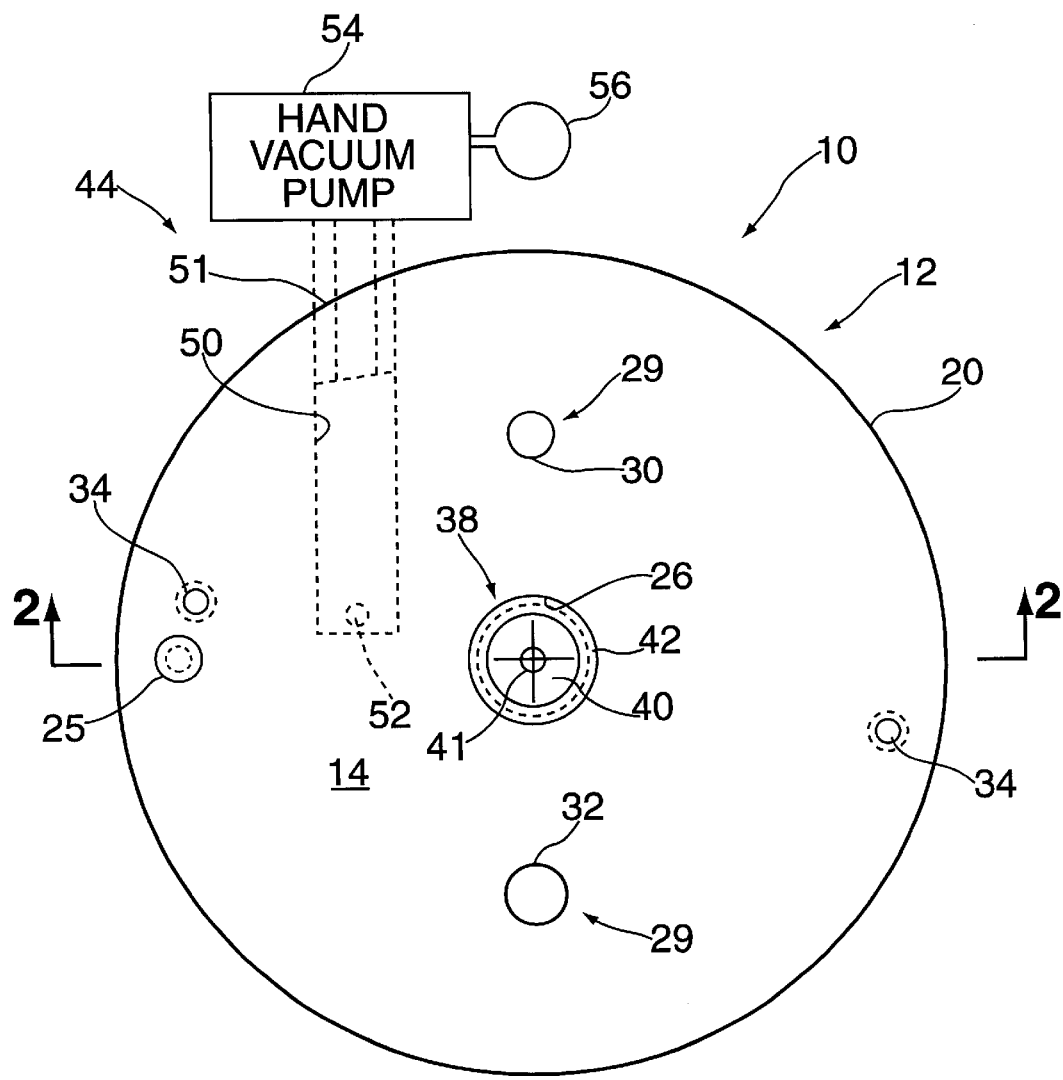
FIG. 1 is a top plan view of a target base in accordance with one embodiment of the present invention.
Figure 2:
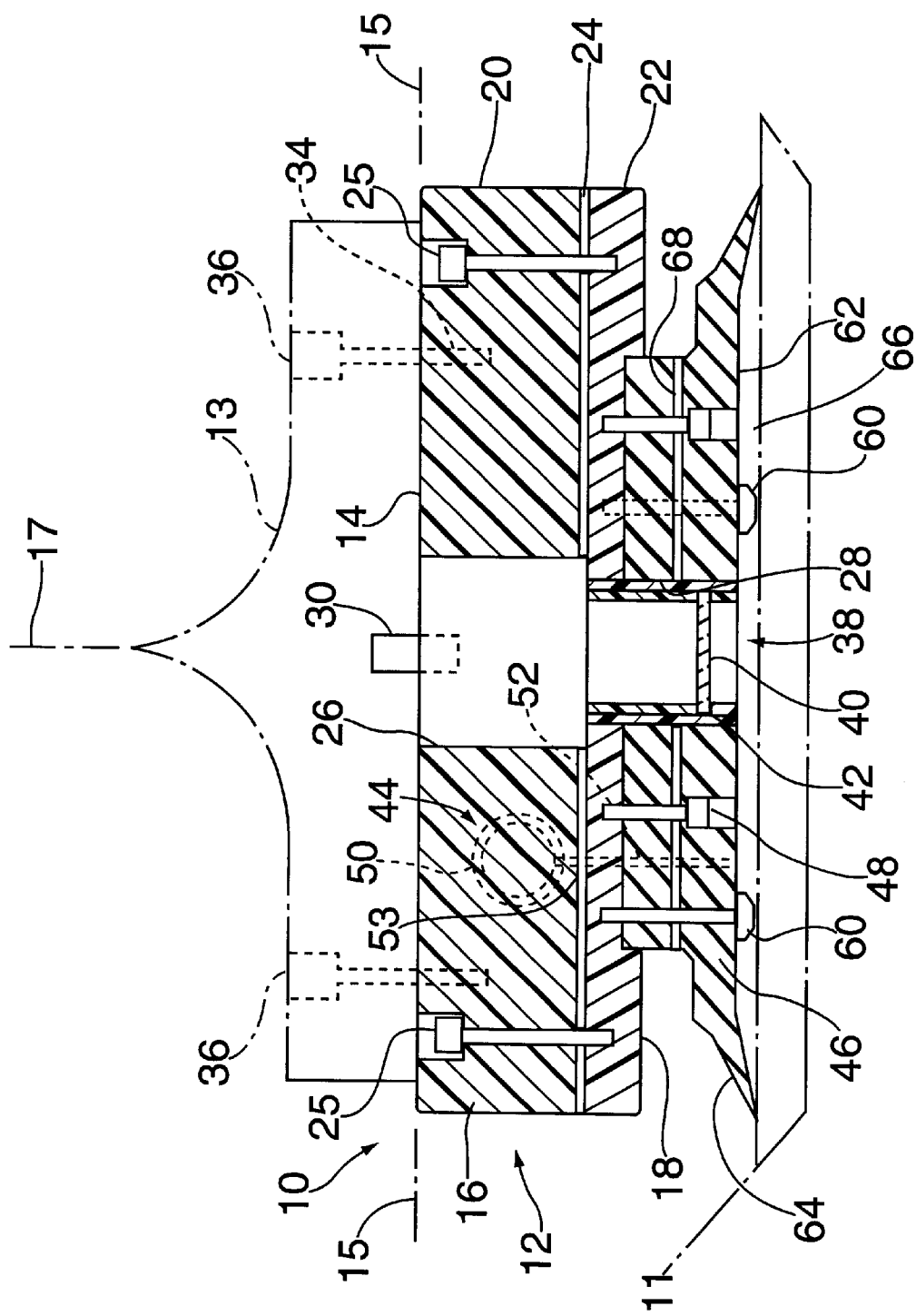
FIG. 2 is a side cross-sectional view taken along line 2—2 of FIG. 1 of a target base.
Figure 3:
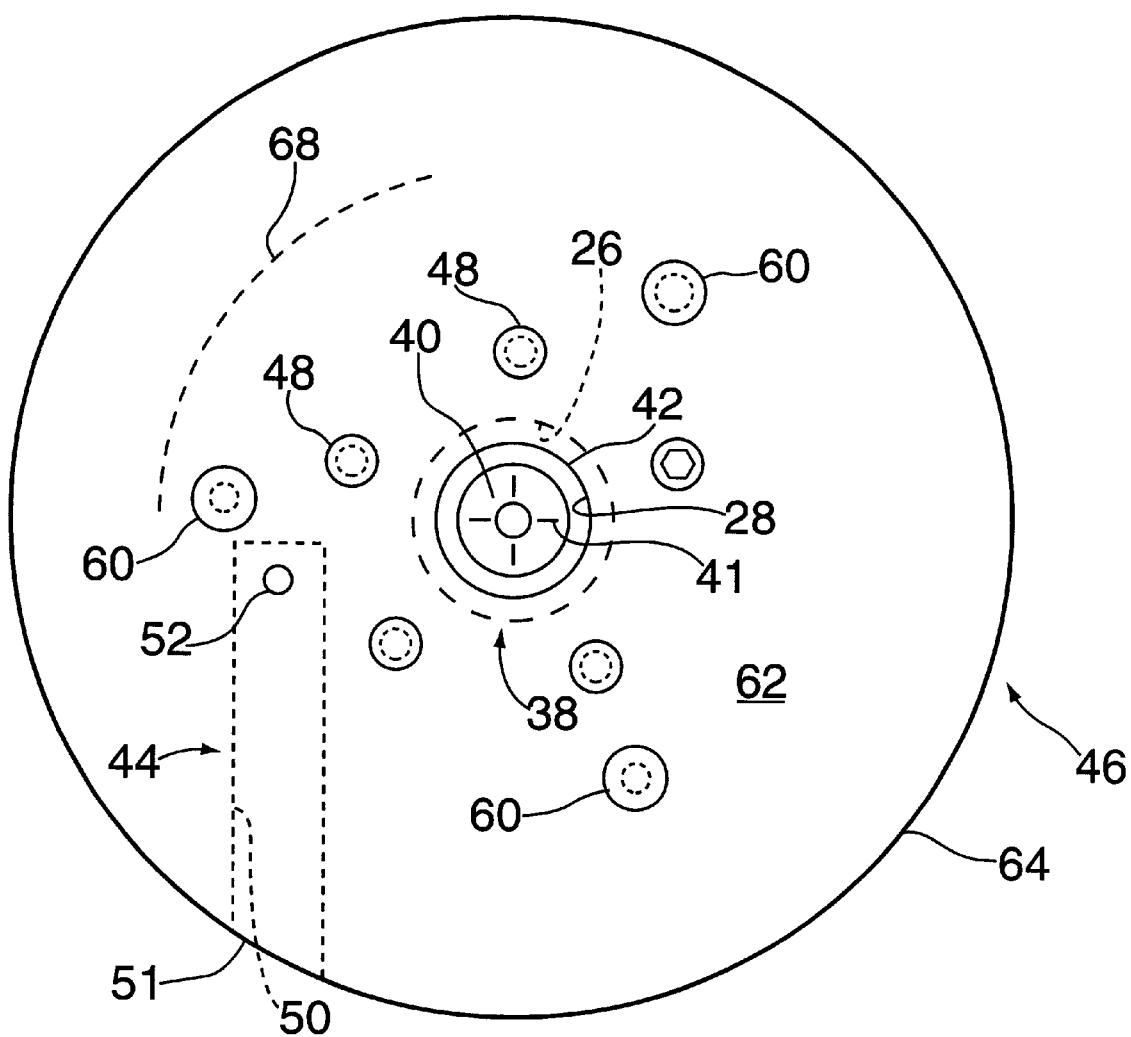
FIG. 3 is a bottom plan view of the target base of FIG. 1.

FIGS. 1 through 3 illustrate various aspects of one embodiment of a target base that may be used for attaching an optical or laser measuring apparatus onto the surface of an object. The target base may include a relatively large suction cup that forms with the object a vacuum chamber. A number of contact members located within the vacuum chamber contact the surface of the object to assure accurate and consistent off-set positioning of the target with respect to the surface of the object.

According to one embodiment of the present invention, illustrated in FIG. 2, a target base 10 includes a body 12 having a mount surface 14 that faces opposite an object 11 being measured, a perimeter wall 16, and a base surface 18 opposite from the mount surface 14. The mount surface 14 is configured to mate with an apparatus or target 13. In a broad sense, the mount surface 14 has a reference plane 15 from the point of view of establishing a position of the target 13 with respect to the body 12, including distance and orientation, and a center axis 17 that is perpendicular to the reference plane 15. In a particular embodiment, the mount surface 14 is planar and coincides with the reference plane 15. In practice, a planar mount surface 14 has the advantage of being easy to form with high accuracy and is preferred for that reason. It will be understood that mount surface 14 may be any surface suitable to mate with target 13 without departing from the scope of the present invention.

Although the body 12 may be fabricated in a single piece, the embodiment, as illustrated, includes an upper piece 20 and a lower piece 22 joined at a split line 24 by countersunk cap screws 25 that are equally spaced apart on a circle near the perimeter of the body 12. The upper and lower pieces, 20 and 22, may be annular, each having a circular cylindrical perimeter wall 16 of the same diameter with the upper and lower pieces, 20 and 22, having a hole 26, 28, respectively concentric with the axis 17.

A locating system 29 may be associated with the mount surface 14 of the body 12 to mate the apparatus or target 13 with the target base 10 such that the target 13 can be mated to the base 10 in only one position. The locating system 29 may include locating elements for positioning the target 13 with the target base 10. In one embodiment, as shown in FIG. 1, the locating elements include two circular cylindrical bosses 30 and 32 of different diameters spaced apart from each other. It will be understood that the locating elements may be any suitable positioning device or system without departing from the scope of the present invention.

In addition to the locating system 29, threaded holes 34 at the mount surface 14 of the body 12 receive screws 36 by which the target 13 may be attached to the body 12 after being correctly positioned.

In one embodiment of the present invention, as shown in FIGS. 1 and 2, a sight system 38 may be used to position the target base 10 over the point on the object 11 to be measured. The sight system 38 may include the hole 26 in the upper piece 20 of the body 12, and the hole 28 in the lower piece 22 of the body 12. A reticle 40 may be supported by and sealed within a mounting sleeve assembly 42 which is housed within the hole 28. As shown in FIGS. 1 and 3, the reticle 40 may include a targeting guide 41 having cross hairs for precise positioning of the target base 10 over the point on the object 11 to be measured.

As illustrated in FIGS. 2 and 3, a suction cup 46 may be attached to the base surface 18 of the body 12 by screws 48, the heads of which bear against a reinforcing disc 68 embedded in the relatively thicker body of the suction cup 46 and the shanks of which are threaded into holes in the lower piece 22 of the body 12. The sealing lip 64 of the suction cup 46 may be concentric with the axis 17 and forms a suction cavity 62 on the base surface 18 side of the target base 10. It will be understood that target base 10 may include a plurality of suction cups 46 without departing from the scope of the present invention.

When in place on the object 11, the sealing lip 64 and cavity 62 form a vacuum chamber 66. A vacuum pressure is communicated to the vacuum chamber 66 by a vacuum system 44. The vacuum system 44 may include a first passage 52 extending from the vacuum chamber 66 to a second passage 50 that extends to a port opening 51 in the perimeter wall 16 of the body 12. An O-ring 53 seals the passage 52 at the split line 24 between the parts 20 and 22. As shown in FIG. 1, a vacuum pump 54 may be coupled in a sealed manner to the second passage 50 through the port opening 51. The vacuum pump 54 may include a gage 56 for measuring the air pressure within the vacuum chamber 66. The vacuum pump 54 may be a hand pump or an automatic pump, such an electric pump. It will be understood that the vacuum pump 54 may be any vacuum pump suitable to form a vacuum within the suction cup 46 without departing from the scope of the present invention.

As shown in FIGS. 2 and 3, one or more contact members 60 establish the off-set spacing and orientation of the reference plane 15 relative to the surface of the object 11 when the target base 10 is in place on the object 11. In one embodiment, the target base 10 includes three contact members 60. In this embodiment, the contact members 60 are equally spaced apart from each other and equidistant from the axis 17. Each contact member 60 may have a rounded head that provides substantially point contact with the surface of the object 11 and may also have threaded shanks that thread into the lower piece 22 of the body 12. The contact members 60 are installed such that the contact points lie in a plane that is substantially parallel to the reference plane 15.

The target base 10 of the present invention is attached to the object 11 by a vacuum applied to the suction cup 46 by the vacuum pump 54. The forming of a vacuum by the pump 54 progressively pulls the target base 10 toward the object 11 until the contact members 60 engage the surface of the object 11. Any additional vacuum beyond that required to engage the contact members 60 only increases the vacuum force acting between the target base 10 and the object 11 to restrain the target base 10 but does not change the position of the mount surface 14, as the contact members 60 serve as stops that establish the off-set distance from the mount surface 14 from the surface of the object 11 and the orientation of the mount surface 14 relative to the surface of the object 11. There is no rebound of the base 10 due to the resiliency of the suction cup 46. Forming a vacuum by the vacuum pump 54 also permits the retention force to be set to a selected value through the use of a pressure gage 56 that may be associated with the pump 54. Subject to the possibility of slow leakage, which can be corrected by periodic checking of the gage 56 and additional pumping as required, the vacuum provides a holding force that is sustainable for indefinite periods. The present invention also makes it possible and advantageous to use a suction cup 46 having a relatively large area which, for any given level of vacuum formed in the chamber 66, provides a correspondingly large retention force.

In use, the target base 10 is first positioned exactly over a target point marked on the object 11 being measured, using the reticle 40 to establish the position and circumferential orientation. The vacuum pump 54 is operated to draw a vacuum in the vacuum chamber 66 of the suction cup 46. The force due to the pressure difference between the atmosphere and the vacuum pulls the body 12 toward the object 11 and engages the contact members 60 with the object 11. After the contact members 60 contact the object 11, the target base 10 can no longer move toward the object 11, and the mount surface 14 is located at a predetermined off-set distance from and parallel to the plane defined by the contact points of the contact members 60. With the aid of the gage 56 of the vacuum pump 54, the user can draw a vacuum of the desired value to ensure retention of the target base 10 on the object 11 with a desired force. After the target base 10 is checked for position using the reticle 40,.the target 13 can be aligned on the mount surface 14 using the locating system 29 and fastened in place with the screws 36.

Ordinarily, the vacuum should hold steady over long periods of time. Prudence suggests that the gage 56 should be checked periodically to ensure that the vacuum is being maintained.

Although one embodiment of the present invention has been described; various changes and modifications may be suggested to one skilled in the art. It is intended that the present invention encompass such changes and modifications as fall within the scope of the present appended claims.

What is claimed is:

1. A target base for attaching an apparatus to an object, the target base comprising:
   a substantially rigid body having a mount surface and a base surface, the mount surface adapted to couple the apparatus to the body;
   a suction cup affixed to the base surface of the body and having a suction cavity defined by a deformable sealing lip at the perimeter of the suction cup, the sealing lip and the suction cavity being adapted to form with the object a vacuum chamber;
   a vacuum system for communicating a vacuum pressure to the vacuum chamber; and
   at least one contact member affixed to the base surface of the body and extending into the suction cavity to provide consistent off-set positioning of the target base with respect to the object.

2. A target base according to claim 1 further comprising a sight system coupled to the body of the target base for precise positioning of the target base with respect to the object.

3. A target base according to claim 2, wherein the sight system comprises:
   an opening extending through the body and the suction cup;
   a mounting sleeve assembly housed within the hole opening; and
   a reticle received in the mounting sleeve assembly, the reticle including a targeting guide used to align the target base with a point on the object.

4. A target base according to claim 1 wherein the contact surface of the contact member is located within the suction cavity.

5. A target base according to claim 1 wherein the contact member has a head configured to make substantially point contact with the surface of the object.

6. A target base according to claim 1 wherein there are three contact members.

7. A target base according to claim 6 further comprising a center axis perpendicular to a plane formed by the mount surface of the body, wherein the contact members are equidistant from each other and from the center axis.

8. A target base according to claim 1 further comprising a center axis perpendicular to a plane formed by the mount surface of the body, wherein the sealing lip of the suction cup is concentric with the center axis.

9. A target base according to claim 1 wherein the suction cup is substantially coextensive with the mount surface.

10. A target base according to claim 1 wherein the suction cup includes a substantially rigid reinforcing plate attached to the body.

11. A target base according to claim 1 further comprising a locating system for mating the apparatus with the mount surface of the target base in a predetermined relative position.

12. A target base according to claim 11 wherein the locating system comprises a plurality of locating elements associated with the mount surface of the target base.

13. A target base according to claim 12 wherein the locating elements comprise two circular cylindrical bosses of different diameters.

14. A target base for attaching an apparatus to an object, the target base comprising:
   a substantially rigid body having a planar mount surface and a center axis perpendicular to a plane of the mount surface, the mount surface adapted to couple the apparatus to the mount surface, and a base surface;
   a suction cup affixed to the base surface of the body and having a suction cavity defined by a deformable sealing lip at the perimeter of the suction cup, the sealing lip and the suction cavity being adapted to form with the object a vacuum chamber;
   a vacuum system for communicating a vacuum pressure to the vacuum chamber;
   an opening coaxial with the center axis and extending through the body and the suction cup;
   a reticle received in the opening in sealed relation; and
   three contact members affixed to the body and extending into the suction cavity, each contact member having a contact surface adapted to contact the object, the contact surfaces of the three contact members defining a plane that is substantially parallel to a plane of the mount surface.

15. A target base according to claim 14 wherein the contact surfaces of the contact members are located within the cavity.

16. A target base according to claim 15 wherein the contact members include threaded attachment shanks that pass through the suction cup and are threaded into the body.

17. A target base according to claim 14 wherein the contact members have heads configured to make substantially point contact with the surface of the object.

18. A target base according to claim 14 wherein the sealing lip of the suction cup is concentric with the center axis and the suction cup is substantially coextensive with the mount surface.

19. A target base according to claim 14 wherein the suction cup includes a substantially rigid reinforcing plate and is fastened to the body by screws having heads that bear against the reinforcing plate and threaded shanks received in threaded openings in the body.

20. A target base according to claim 14 further comprising a locating system for positioning the apparatus with the mount surface of the target base in a predetermined relative position.

21. A target base according to claim 20 wherein the locating system comprises two circular cylindrical bosses of different diameters associated with the mount surface of the target base.

22. A target base according to claim 14 wherein the body comprises an upper and lower piece, which are joined to each other along a planar split plane substantially parallel to the mount surface.

* * * * *